(12) United States Patent
Lavine et al.

(10) Patent No.: US 11,788,822 B2
(45) Date of Patent: Oct. 17, 2023

(54) ULTRA-COMPACT, MODULAR LASER SENSOR FOR TACTICAL ENVIRONMENTS

(71) Applicant: Raytheon Company, Waltham, MA (US)

(72) Inventors: Jason R. Lavine, McKinney, TX (US); Stephen F. Sagan, Lexington, MA (US); Brian M. Graue, Melissa, TX (US); Justin Paul, Melissa, TX (US)

(73) Assignee: Raytheon Company, Waltham, MA (US)

( * ) Notice: Subject to any disclaimer, the term of this patent is extended or adjusted under 35 U.S.C. 154(b) by 609 days.

(21) Appl. No.: 16/936,944

(22) Filed: Jul. 23, 2020

(65) Prior Publication Data
US 2022/0026182 A1    Jan. 27, 2022

(51) Int. Cl.
| F41H 13/00 | (2006.01) |
| G01B 11/27 | (2006.01) |
| G02B 5/10 | (2006.01) |
| G02B 5/122 | (2006.01) |
| G02B 27/10 | (2006.01) |

(52) U.S. Cl.
CPC ....... *F41H 13/0062* (2013.01); *G01B 11/272* (2013.01); *G02B 5/10* (2013.01); *G02B 5/122* (2013.01); *G02B 27/108* (2013.01)

(58) Field of Classification Search
CPC .. F41H 13/0062; F41H 13/005; G01B 11/272
See application file for complete search history.

(56) References Cited

U.S. PATENT DOCUMENTS

| 6,809,307 | B2 | 10/2004 | Byren et al. |
| 7,626,152 | B2 | 12/2009 | King et al. |
| 7,671,337 | B1 | 3/2010 | Tidwell |
| 2003/0174315 | A1 | 9/2003 | Byren |
| 2016/0103309 | A1* | 4/2016 | Suzuki ................ G02B 27/145 359/388 |

(Continued)

FOREIGN PATENT DOCUMENTS

WO    2020/226721 A1    11/2020

OTHER PUBLICATIONS

Pending claims of co-pending U.S. Appl. No. 16/552,997, filed Aug. 27, 2019.

(Continued)

*Primary Examiner* — Thanh Luu
(74) *Attorney, Agent, or Firm* — Renner, Otto, Boisselle & Sklar (57) ABSTRACT

A laser sensor system including a common optical bench that is configured to receive and process different beams of a high energy laser (HEL). The common optical bench is configured to handle the different beams using a modular set of optical components. Optical components of the common optical bench include a filtering device configured to reduce the power of the beams, a common collecting optical element that is configured to set an imaging position and focal length for the beams, a position sensitive detector (PSD) arrangement that is configured to measure angular and positional errors in the beams, and various compaction optical elements, such as mirrors, that are configured to enable compaction of the laser sensor system by increasing the focal length of the beams.

18 Claims, 7 Drawing Sheets

(56) References Cited

U.S. PATENT DOCUMENTS

2017/0234658 A1    8/2017  Segev et al.
2018/0267299 A1*   9/2018  Sitter, Jr. ................ G01S 17/66
2020/0141795 A1    5/2020  Lavine

OTHER PUBLICATIONS

Pending claims of co-pending U.S. Appl. No. 16/406,414, filed May 8, 2019.
Invitation to Pay Additional Fees mailed Sep. 30, 2021 in corresponding International Application No. PCT/US2021/038385.

* cited by examiner

ULTRA-COMPACT, MODULAR LASER SENSOR FOR TACTICAL ENVIRONMENTS

FIELD OF THE DISCLOSURE

The disclosure is in the field of high-energy laser weapons.

THE RELATED ART

Various applications may use high energy lasers. An example of a suitable application for a high energy laser (HEL) includes directed energy weapons. High energy laser applications may use low-power alignment and HELs in a common optical path to provide pointing accuracy prior to and during the laser shot. This enables the energy to be put on the target of interest and monitoring pointing stability to avoid power loss or damage within the system. HELs also have near field and far field components which must be managed to reduce beam wander and beam jump. Management of the beams is difficult due to the difference in wavelength and power level.

Prior attempts at improving HELs include utilizing multiple optics and split paths. The prior attempts are deficient in that the split paths have independent beam errors. Still another disadvantage is that the common optical bench must be enlarged to accommodate the multiple optical paths.

SUMMARY

According to a general embodiment, a laser sensor system according to the present application includes a common optical bench that is configured to receive and process different beams of a high energy laser (HEL), such as a main HEL beam and an auto-alignment beam. The common optical bench is configured to handle the different beams using a modular set of optical components that are configured to meet the requirements of a particular application. Optical components of the common optical bench include a filtering device configured to reduce the power of the beams, a common collecting optical element that is configured to set an imaging position and focal length for the beams, a position sensitive detector (PSD) arrangement that is configured to measure angular and positional errors in the beams, and various compaction optical elements, such as mirrors, that are configured to enable compaction of the laser sensor system by increasing the focal length of the beams.

In exemplary embodiments, the collecting optical element may include achromatic refractive and/or reflective elements. The PSD arrangement includes at least one positional PSD, at least one angular PSD, and various combinations of beam splitters, mirrors, retroreflectors, corner cubes, beam benders, manipulators, and other optical elements. The compaction optical elements may include further mirrors, beam benders, etc. that are used in conjunction with the PSD arrangement to further manipulate the beams. The filtering device may include a filter wheel. The common optical bench may include many different configurations of beam directing and reflecting optics.

The modular laser sensor system is advantageous in that the laser sensor system is configured to independently measure angular errors and positional errors of the different beams. Using the PSD arrangement enables measurements over long periods that are subject to different environmental stresses, including mechanical strain, vibration, and temperature variations across multiple wavelengths and power levels of the different beams. Using the common optical bench and materials enables minimizing false error inputs that are generated internal to the laser device. Using the common collecting optic is further advantageous in enabling compaction of the overall packaging for the laser sensor system by receiving multiple different beams. Still another advantage of the common optical bench is that the modularity enables additional optical paths to be split off to additional sensors in the sensor, or two angle sensors that correspond to two different color lasers.

According to an aspect of the disclosure, an HEL system includes a modular arrangement of optical components.

According to an aspect of the disclosure, a laser system includes a common optical bench arranged along a common optical path downstream of an HEL beam source and upstream of output optics.

According to an aspect of the disclosure, a laser system includes a high-energy laser (HEL) beam source configured to generate different beams that share a common optical path, output optics downstream of the HEL beam source along the common optical path, and a common optical bench arranged along the common optical path downstream of the HEL beam source and upstream of the output optics, the common optical bench being configured to receive the different beams and including a power filtering device, at least one collecting optical element optically coupled to and downstream the power filtering device, a position sensitive detector (PSD) arrangement for measuring angular and positional errors in the different beams, the PSD arrangement being optically coupled to and downstream the at least one collecting optical element, and at least one compaction optical element optically coupled to the PSD arrangement.

According to an embodiment of any paragraph(s) of this summary, the at least one collecting optical element includes an achromatic refractive and/or reflective element.

According to an embodiment of any paragraph(s) of this summary, the PSD arrangement includes at least one positional PSD, at least one angular PSD, and at least one of a mirror, a cube corner, a retroreflector, or a beam bender.

According to an embodiment of any paragraph(s) of this summary, the PSD arrangement includes a beam splitter optically coupled to the at least one collecting optical element.

According to an embodiment of any paragraph(s) of this summary, the at least one compaction optical element includes a mirror, a corner cube, a retroreflector, or a beam bender.

According to an embodiment of any paragraph(s) of this summary, the PSD arrangement includes a corner cube and the at least one compaction optical element includes a spherical mirror optically coupled to the corner cube.

According to an embodiment of any paragraph(s) of this summary, the at least one compaction optical element arrangement includes at least one fold mirror.

According to an embodiment of any paragraph(s) of this summary, the PSD arrangement includes at least one scraper mirror.

According to an embodiment of any paragraph(s) of this summary, the at least one compaction optical element includes a re-image transform optical element and/or a far field transform optical element.

According to an embodiment of any paragraph(s) of this summary, the at least one compaction optical element includes at least one fold mirror downstream the re-image transform optical element and/or the far field transform optical element, and upstream a PSD of the PSD arrangement.

According to an embodiment of any paragraph(s) of this summary, the PSD arrangement includes PSDs and at least one tracking sensor.

According to an embodiment of any paragraph(s) of this summary, the filtering device includes a filter wheel.

According to an embodiment of any paragraph(s) of this summary, the HEL beam source emits an HEL beam and an auto-alignment beam that is co-aligned with the HEL beam along the common optical path, the common optical bench being configured to receive the auto-alignment beam and a portion of the HEL beam.

According to an embodiment of any paragraph(s) of this summary, the laser sensor system includes a housing in which the at least one collecting optical element, the PSD arrangement, and the at least one compaction optical element are housed.

According to an embodiment of any paragraph(s) of this summary, the common optical bench is modular.

According to another aspect of the disclosure, an HEL weapon includes a high-energy laser (HEL) beam source configured to generate different beams that share a common optical path, output optics downstream of the HEL beam source along the optical path, and a common optical bench arranged along the common optical path downstream of the HEL beam source and upstream of the output optics, the common optical bench being configured to receive the different beams and including a power filtering device, at least one collecting optical element optically coupled to and downstream the power filtering device, a position sensitive detector (PSD) arrangement for measuring angular and positional errors in the different beams, the PSD arrangement being optically coupled to and downstream the at least one collecting optical element, and at least one compaction optical element optically coupled to the PSD arrangement.

According to still another aspect of the disclosure, a method of operating an HEL weapon includes sending different beams of the HEL weapon through a common optical bench arranged along a common optical path of the HEL weapon, the beams including an auto-alignment beam and at least part of an HEL beam, reducing power of the beams through a power filtering device of the common optical bench that is optically downstream of a beam source of the HEL weapon, setting an imaging position and a focal length using a collecting optic of the common optical bench, the collecting optic being downstream the filtering device, measuring angular errors and positional errors of the different beams using a position sensitive detector (PSD) arrangement of the common optical bench downstream the collecting optic, and controlling the different beams using optical elements of the PSD arrangement and further compaction optical elements of the common optical bench that are optically coupled to the PSD arrangement.

According to an embodiment of any paragraph(s) of this summary, the method includes increasing the focal length of at least one of the different beams using at least one of a mirror, a corner cube, a retroreflector, or a beam bender.

According to an embodiment of any paragraph(s) of this summary, the method includes splitting the different beams off from the common optical path using a beam splitter of the common optical bench.

According to an embodiment of any paragraph(s) of this summary, the method includes independently measuring angular errors and positional errors of the different beams using the PSD arrangement of the common optical bench relative to beam correction sensors and/or tracking sensors arranged downstream the PSD arrangement.

To the accomplishment of the foregoing and related ends, the disclosure comprises the features hereinafter fully described and particularly pointed out in the claims. The following description and the annexed drawings set forth in detail certain illustrative embodiments of the invention. These embodiments are indicative, however, of but a few of the various ways in which the principles of the disclosure may be employed. Other objects, advantages and novel features of the disclosure will become apparent from the following detailed description when considered in conjunction with the drawings.

BRIEF DESCRIPTION OF DRAWINGS

The annexed drawings, which are not necessarily to scale, show various aspects of the disclosure.

DETAILED DESCRIPTION

The principles described herein have application in high-energy laser (HEL) applications. An example of an HEL application includes a directed energy weapon. Other non-lethal applications may also be suitable. A laser sensor system has a common optical path that is configured to handle multiple different beams over at least parts of the path, including an HEL beam, as well as one or more additional beams, such as an auto-alignment beam or a target-tracking beam. The laser sensor system according to the present application includes a common optical bench arranged along the common optical path downstream of an HEL beam source and upstream of output optics for the HEL.

Figure 1:
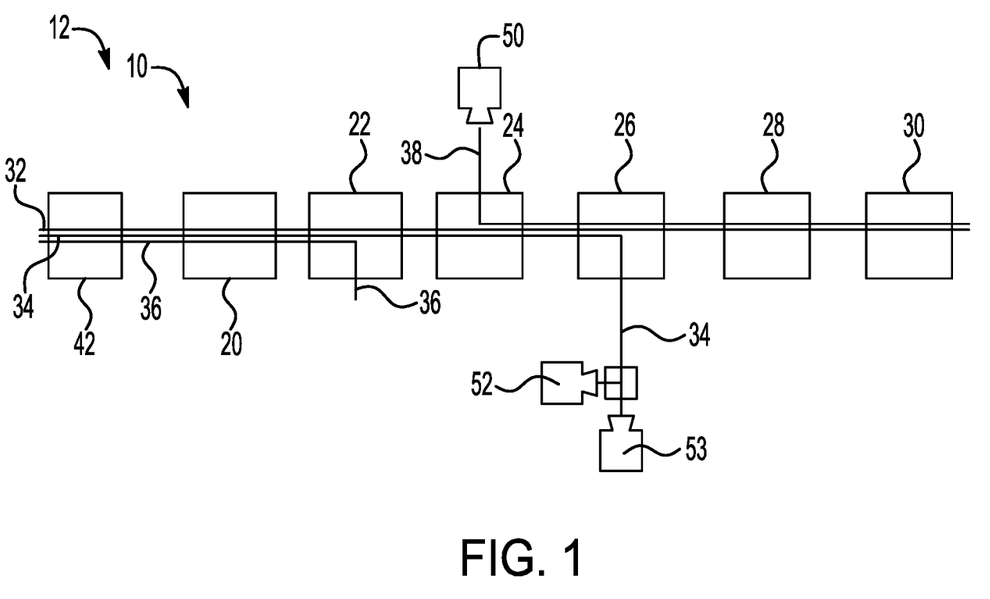
FIG. 1 shows a block diagram of a laser sensor system according to an embodiment of the disclosure.

FIG. 1 shows a block diagram of a laser sensor system 10 for a high-energy laser (HEL) weapon 12 according to an exemplary embodiment. The laser sensor system 10 includes several beams that have different characteristics and are used for different purposes, as explained further below. The beams are passed through optical elements, represented schematically by blocks 20, 22, 24, 26, 28, 30. Each of the blocks 20, 22, 24, 26, 28, and 30 represents any individual or combination of possible optical elements, including reflective elements such as mirrors, transmissive elements such as lenses or filters, beam splitters, expanders, and/or other optical elements.

A series of light beams (or light from light sources) 32, 34, 36, and 38 pass through all or some of the blocks 20, 22, 24, 26, 28, and 30. The direction of movement through the blocks 20, 22, 24, 26, 28, and 30, in that order, is described herein as a downstream direction. This is the direction in which beams or other light are processed after being produced within the laser sensor system 10, and then emitted from the laser sensor system 10. This downstream direction is the direction that light travels from at least some light sources within the laser sensor system 10. The opposite direction, in which light entering the laser sensor system 10 from outside (such as light reflected off of a target) is referred to as the upstream direction.

The light beams may include an HEL beam 32, an auto-alignment beam 34, a target or boresight illuminator beam 36, and imaging light 38 from an imaging source. The beams 32, 34, 36, 38 may have different wavelengths and power levels. In the illustrated embodiment, the high-energy laser beam 32, the auto-alignment beam 34, and the target or boresight illuminator beam 36 all may be sent from various laser or other light sources 42, for example, including an HEL beam source for the HEL beam 32. Some or all of the beams 32, 34, and 36 may be initially misaligned, for example being misaligned angularly and/or spatially. The beams 32, 34, and 36 may first pass through a beam correction block 20 which can be used to correct the misalignment of some or all of the beams 32, 34, and 36. For example, the beam correction block 20 may include fast steering mirrors (FSMs) that can be controlled to correct at least some of the misalignment of the beams 32, 34, and 36. Other devices and/or mechanisms for correcting beam misalignment are possible.

The block 22 represents a location where the target or boresight illuminator beam (or other beams used to meet mission parameters) 36 may be picked off or diverted. This is an optional feature, and in an alternative embodiment the pickoff block 22 may be omitted. For example, the target or boresight illuminator beam 36 may be used to illuminate the target during firing of the HEL beam 32, to maintain target acquisition during the laser heating process. The beam 36 may be a lower-power high-divergence target illuminating laser, and target tracking during its use may be pared down the tracking to only that the wavelength that the beam 36 uses.

The block 24 represents a location where an incoming light beam 38 may be directed to a high-speed tracking sensor 50. The light from an external light source 38, such as from a target, travels in the opposite direction from the beams 32, 34, and 36, right to left in FIG. 1. The light 38 reached the tracking sensor pickoff block 24 after passing through (in order) the output optics in block 30 and the high-speed tracking correction in block 28, and the beam correction pickoff block 26. The light 38 is return light, a reflection off of the target from illumination by one or more other beams emitted by the laser sensor system 10, such as a reflection from the target illuminator beam 36, for the purpose of tracking of the target. Alternatively, the light 38 may be passively tracked light from a target or other object, without illumination from the laser sensor system 10. The target illuminator beam 36 may be a low-power laser beam following at least part of the same path and directed through at least some of the same optics as the high-energy laser beam 32. The target illuminator beam 36 may exit the laser sensor system 10 without passing through all of the same optics as the high-energy laser beam 32. For example, the target illuminator beam 36 may be 50-watt illuminator that exits the laser sensor system 10 without passing through an expansion portion of the optics.

The tracking sensor 50 may be any of a variety of cameras or other sensors for target acquisition and tracking. In one embodiment the tracking sensor 50 may be a 30 Hz camera, for example capable of detecting short-wavelength infrared (SWIR) and/or near infrared (NIR) radiation. Output from the tracking sensor 50 may be used to provide imaging feedback and/or to position the HEL beam 32 on the target.

The block 26 represents a location where the auto-alignment beam 34 is directed to beam correction sensors or coudé optical position sensors (COPS) 52, 53. The beam correction sensors 52, 53 provide measurements of angular and spatial beam error and are configured to image the optical components of the laser sensor system 10. Alternatively, the beam 34 may represent part of the HEL laser beam that is sent to the beam correction sensors 52, 53 for determining appropriate correction. The auto-correction beam 34 may include a part of the main HEL beam 32.

The block 28 represents a high-speed tracking correction block, where correction devices, such as fast steering mirrors, are used to correct any deficiencies in the beam error, such as errors introduced by misaligned optical elements. The correction block 28 uses data from the beam correction sensors 52, 53 to guide the fast steering mirrors. All of the optics in the blocks 20-30 are subject to monitoring by the sensors and correction by the correction portions. All of the optical elements are sensed by at least the sensor 50, or the beam correction sensors 52, 53.

Figure 2:
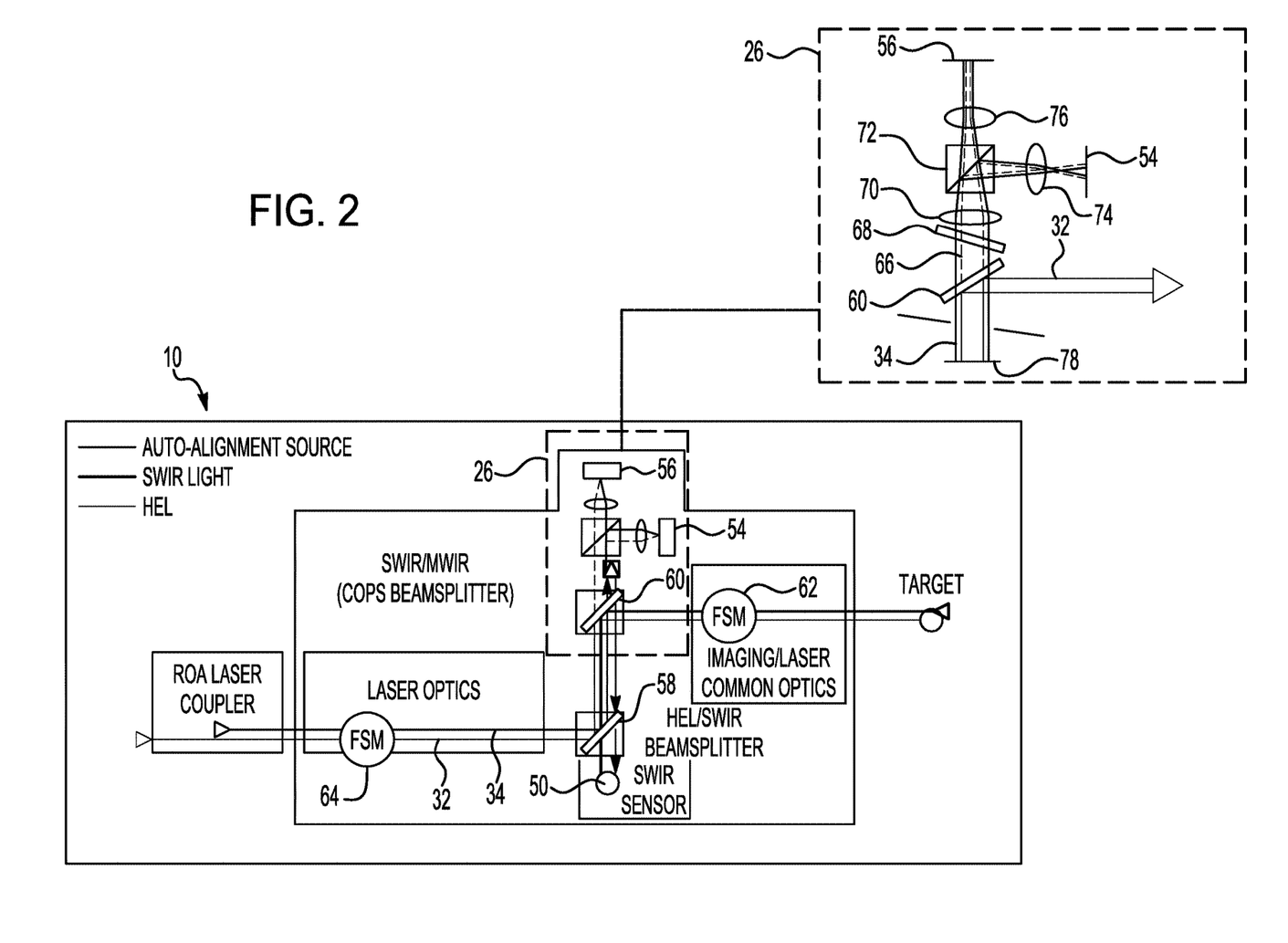
FIG. 2 shows the laser sensor system of FIG. 1 with details of a common optical bench.

Referring in addition to FIG. 2, FIG. 2 shows further features of the laser sensor system 10 and the common optical bench 26 that is arranged along the common optical path and configured to independently measure angular errors and positional errors in the multiple different beams 32, 34. The common optical bench 26 includes a position sensitive detector (PSD) arrangement having positional and angular PSDs 54, 56 that are configured to handle the different beam lengths and power levels. The PSDs 54, 56 provide independent measurements relative to those of the beam corrections sensors 52, 53 and other sensors in the laser sensor system 10, such that the common optical bench 26 is able to minimize false error inputs being provided to the other sensors and cameras within the laser sensor system 10. For example, the beam correction sensors 52, 53 and/or other sensors and/or cameras may be arranged downstream the PSDs 54, 56. In the illustrated embodiment, the PSD 54 may be an angular PSD and the PSD 56 may be a positional PSD.

Prior to the beams being received at the common optical bench 26, the laser sensor system 10 further includes retroreflection along the common optical path between beam splitters 58, 60. The beam splitters 58, 60 are used to direct beams to the tracking sensor 50, and the common optical bench 26. The beam splitter 58 may be an HEL/SWIR beam splitter, which reflects the HEL beam 32 while splitting the short-wavelength infrared (SWIR) return light 38. The beam splitter 60 reflects the HEL beam 32 and the return light 38, while letting through the auto-alignment beam 34, which may be an SWIR or a mid-wavelength infrared (MWIR) beam.

As shown in FIG. 2, the tracking sensor 50 may be an SWIR sensor, or other sensor configured to detect an appropriate wavelength or range of wavelengths. The sensor 50 is operatively coupled to FSM 62 to control the FSM 62. The common optical bench 26 may include components that are part of a laser beam optical positioning system and operatively coupled to FSM 64 for controlling the FSM 64.

FIG. 2 shows the auto-alignment beam 34 and a partial beam 66 of the main HEL beam 32 being received by the common optical bench 26 from the beam splitter 60. The partial beam 66 may be referred to as leakage of the main HEL beam 32. The common optical bench 26 includes a set of modular components that may be selected to meet the requirements of a particular mission or application for the system 10. The common optical bench 26 is configured to independently measure angular and positional errors in the beams across multiple wavelengths and power levels such that false error inputs are minimized in the laser sensor system 10. Compaction of the laser sensor system 10 is enabled by the common optical components of the optical bench 26 used to process the different beams.

The common optical bench 26 includes a power filtering device 68 that is downstream and optically coupled to the beam splitter 60. The power filtering device 68 is upstream relative to the additional optical elements of the common optical bench 26. Any suitable filter device and filtering materials may be used, including fixed filter elements or active filter elements. For example, the power filtering device 68 may be a filter wheel. The power filtering device 68 is configured to reduce power of the multiple beams 34, 66.

The common optical bench 26 further includes at least one common collecting optical element 70 that is optically coupled to and downstream the power filtering device 68. The collecting optical element 70 is configured to set the imaging position and focal length for the beams 34, 66. Any suitable optical element or elements may be used, including achromatic refractive or reflective sets of optical elements. Any combination and number of mirrors, retroflectors, filters, lenses, and condensers may be used in the collecting optical element 70.

The PSD arrangement includes further optical elements 72 that are optically coupled to the common collecting optical element 70. The optical elements 72 are optically coupled with the PSDs 54, 56 to achieve a desired sensor configuration. The optical elements 72 may be configured to position and/or angle the beam correction sensors 52, 53 and/or cameras relative to the PSDs 54, 56. The modularity of the common optical bench 26 enables many different configurations and numbers of optical elements 72 in the laser sensor system 10. For example, using the optical elements 72 may enable the laser system 10 to have two angle sensors for two different color lasers.

Using the PSD arrangement is advantageous in that the PSD arrangement is configured to measure angular and positional errors of the beams 34, 66 over long periods subject to environmental stresses including mechanical strains, vibrations, and temperature variations across multiple wavelengths and power levels of the beams 34, 66. For example, the PSD arrangement may be arranged to stabilize the beams relative to the beam correction sensors, which may include angular coudé optical position sensors (A-COPS) and positional coudé optical positions sensors (P-COPS). The PSD arrangement may be arranged to stabilize a coudé path by providing angular and positional correction using sensors that are angular or positional in nature. The PSDs may be utilized to move a fast steering mirror, such as to drive a beam backwards and/or correct the beam.

The optical elements 72 may include a beam splitter configured to split the beams off to additional sensors of the optical system 10. Combinations of retroreflectors or corner cubes and/or other optical elements may constitute the optical elements 72. Combinations of mirrors, beam splitters, lenses, beam benders, beam expanders, focusing elements, beam directors, optical scrapers, and switches may be used as the optical elements. The beams may be configured to be slightly out of focus to prevent reaching the laser induced damage threshold (LIDT) on the PSD, such as the angular PSD 54.

The common optical bench 26 further includes at least one or a set of compaction optical elements 74, 76 downstream the at least one common collecting optical element 70 and upstream the PSDs 54, 56. The compaction optical elements 74, 76 may be optically coupled to the PSDs 54, 56 and/or the optical elements 72 of the PSD arrangement. The optical elements 72 may work in conjunction with the compaction optical elements 74, 76 such that the compaction optical elements 74, 76 are at least part of the optical elements 72. Combinations of mirrors, beam splitters, lenses, retroreflectors, beam benders, manipulators, beam expanders, focusing elements, beam directors, optical scrapers, and switches may be used as the compaction optical elements 74, 76.

The set of compaction optical elements 74, 76 are configured to compactify the laser sensor system 10, such as by folding the beams or increasing the focal length of the beams 32, 66. The laser sensor system 10 is compactified by using a common optical set for the beams 32, 66 to minimize packaging constraints. The compaction optical elements 74, 76 may include a transform optical element configured to perform a re-image transform and/or far field transform. By moving the beam into the far field, the beam will appear in the far field, at the target, and enable pure angle correction as occurring in angular space. By re-imaging, the beam in the near-field may be viewed, or the beam may be viewed as it appears at the exit aperture in the system.

For example, FIG. 2 shows a far field transform element 74 optically coupled between the beam splitter 72 and the angular PSD 54, a re-image transform element 76 optically coupled between the beam splitter 72 and the positional PSD 56, and a resulting re-image plane 78 of the positional PSD 56. Advantageously, using the compaction optical elements 74, 76 enables accommodation of near field and far field components in the HEL, in contrast to prior laser sensor systems.

Figure 3:
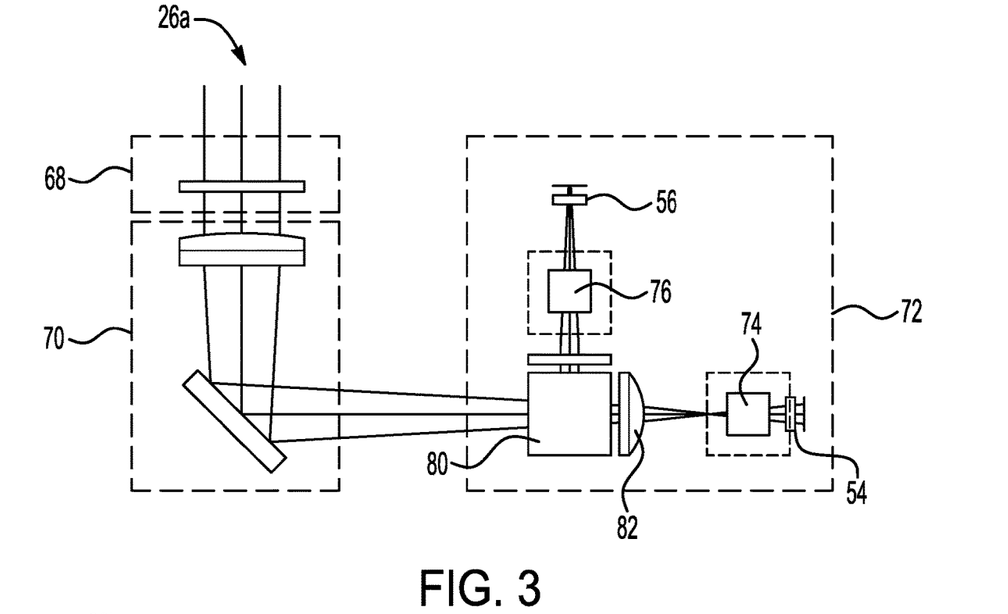
FIG. 3 shows the common optical bench of FIG. 2 according to an exemplary embodiment.

Referring now to FIGS. 3-6, many different configurations and combinations of the power filtering device, the common collecting optical elements, the PSD arrangement, and the compaction optical elements may be suitable. FIG. 3 shows an exemplary embodiment of the common optical bench 26a including the power filtering device 68, the common collecting optical element 70, the optical elements 72 of the PSD arrangement, and the compaction optical elements 74, 76 which are optically coupled between the optical elements 72 and the PSDs 54, 56. The optical elements 72 include at least a beam splitter 80 and a spherical lens 82.

Figure 4:
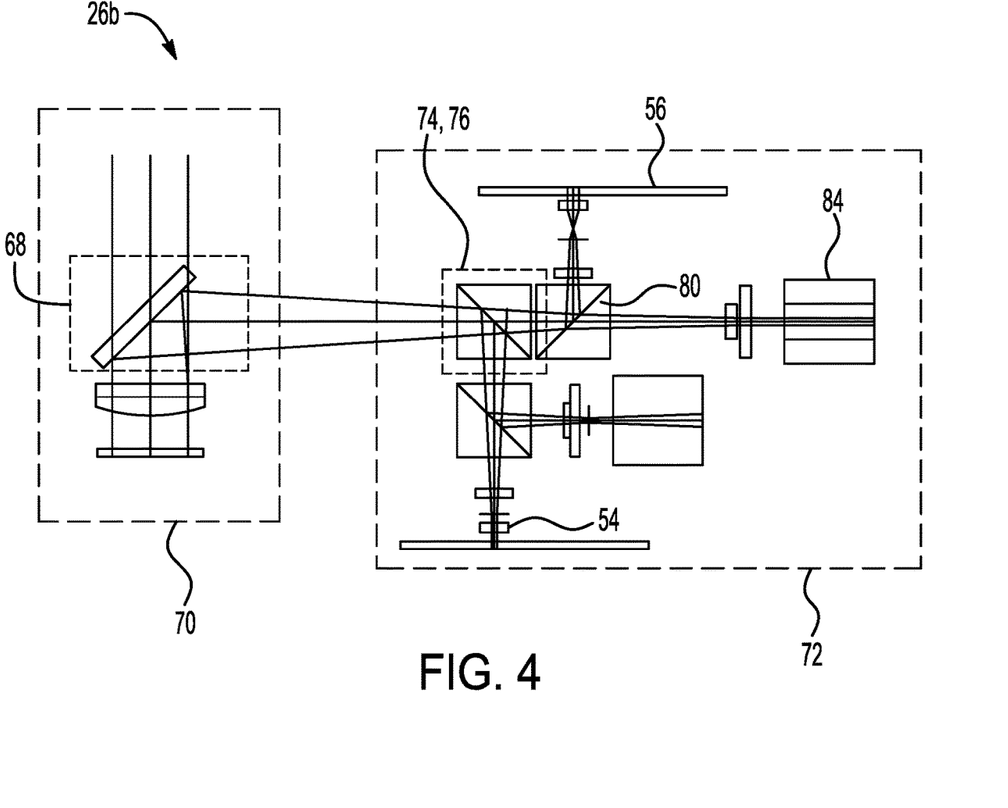
FIG. 4 shows the common optical bench of FIG. 2 according to another exemplary embodiment.

FIG. 4 shows another exemplary embodiment of the common optical bench 26b including the power filtering device 68, the common collecting optical element 70, the optical elements 72 of the PSD arrangement, and the compaction optical elements 74, 76, which may include another beam splitter. The optical elements 72 may include more than one beam splitter 80 that is communicatively coupled to the beam splitter of the compaction optical elements 74, 76. The PSD arrangement further includes a tracking sensor or camera 84, in addition to the PSDs 54, 56, that is optically coupled with the optical elements 72.

Figure 5:
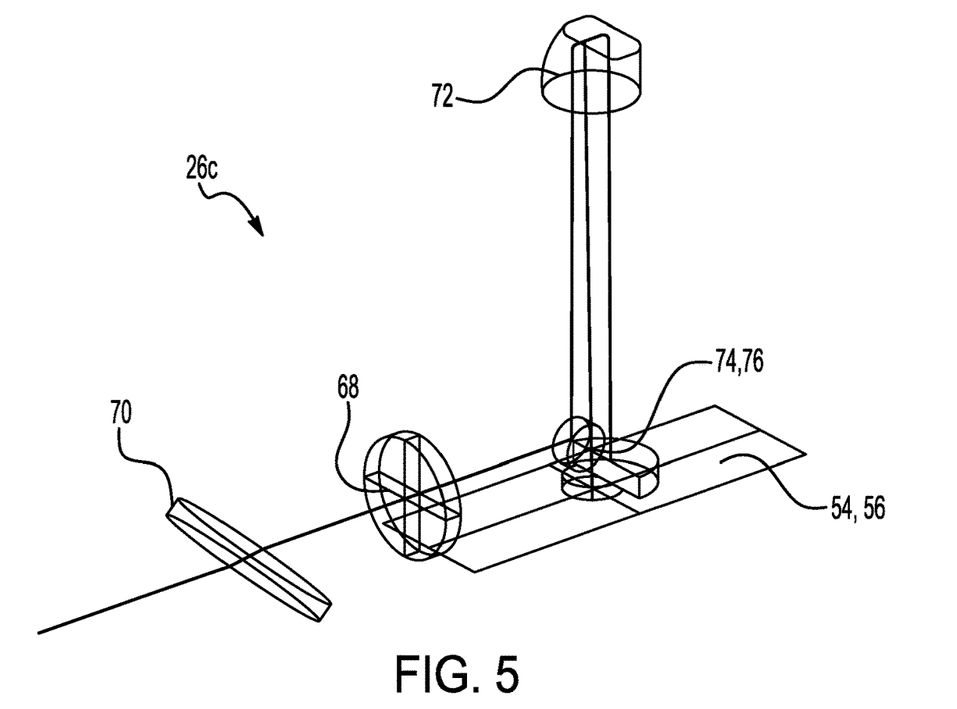
FIG. 5 shows the common optical bench of FIG. 2 according to still another exemplary embodiment.

FIG. 5 shows still another exemplary embodiment of the common optical bench 26c including the power filtering device 68, formed as a filter wheel, the common collecting optical element 70, the optical elements 72 of the PSD arrangement, and the compaction optical elements 74, 76. The optical elements 72 include a corner cube and the set of compaction optical elements 74, 76 includes a spherical mirror optically coupled to the corner cube of the sensor positioning optical elements 72, to increase a focal length of the beams. The corner cube is optically coupled with one of the PSDs 54, 56 and configured to provide three reflections. In other exemplary embodiments, the compaction optical elements 74, 76 may further include fold mirrors that enable additional folding of the beams 32, 66.

Figure 6:
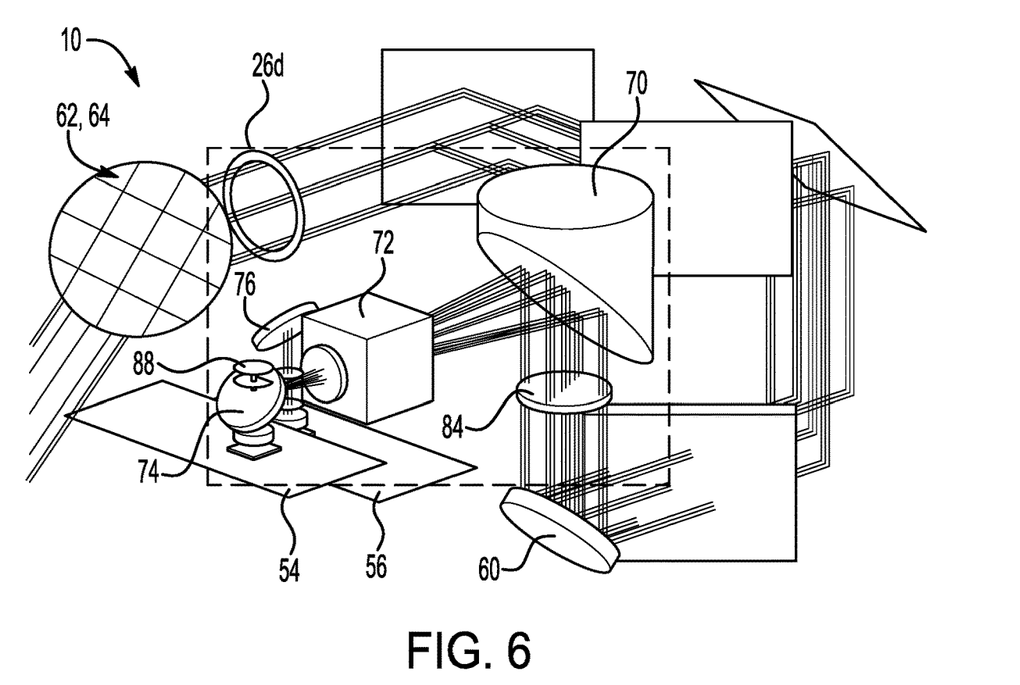
FIG. 6 shows the common optical bench of FIG. 2 according to still another exemplary embodiment in which the common optical bench is implemented in the laser sensor system.

FIG. 6 shows still another exemplary configuration of the common optical bench 26d arranged in the laser sensor system 10. The common optical bench 26d includes the power filtering device 68 that is optically coupled with the beam splitter 60 and the common collecting optical element 70 of the laser sensor system 10. The beam splitter 60 is optically coupled with FSMs 62, 64 as previously described with reference to FIG. 2. The common collecting optical element 70 is optically coupled with the optical elements 72 of the PSD arrangement which include a beam splitter as shown in FIG. 6. The beam splitter 72 is optically coupled with the compaction optical elements 74, 76 which correspond to the PSDs 54, 56, respectively. The compaction optical elements 74, 76 may be formed as transform optic elements and include any other mirrors or other optical components. FIG. 6 also shows the compaction optical elements including a scraper mirror 88 that is positioned relative to the PSD 54.

Figure 7:
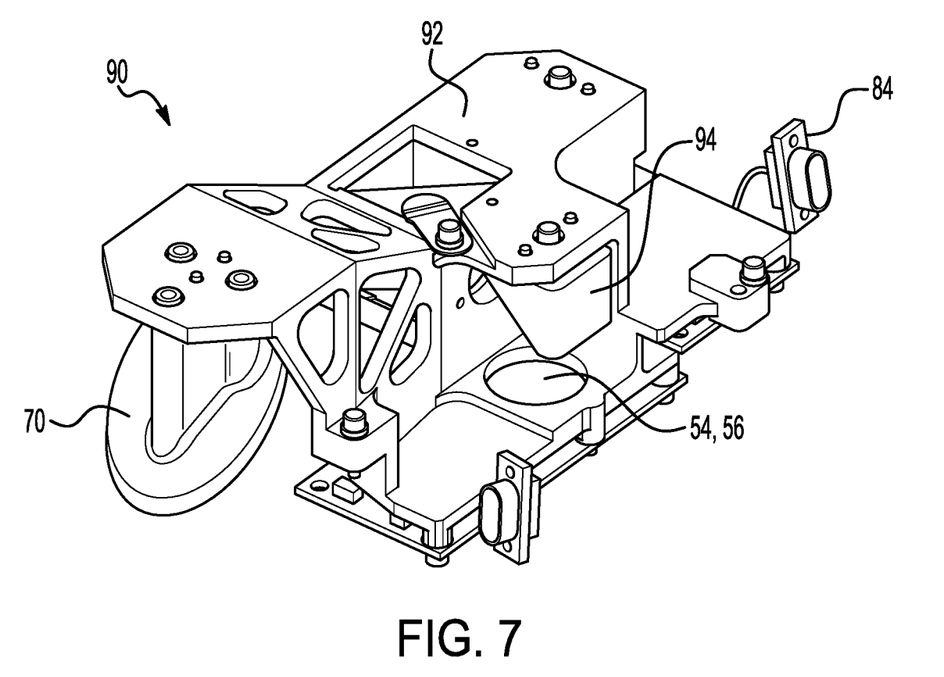
FIG. 7 shows a top oblique view of a sensor housing assembly for the laser sensor system of FIG. 1.
Figure 8:
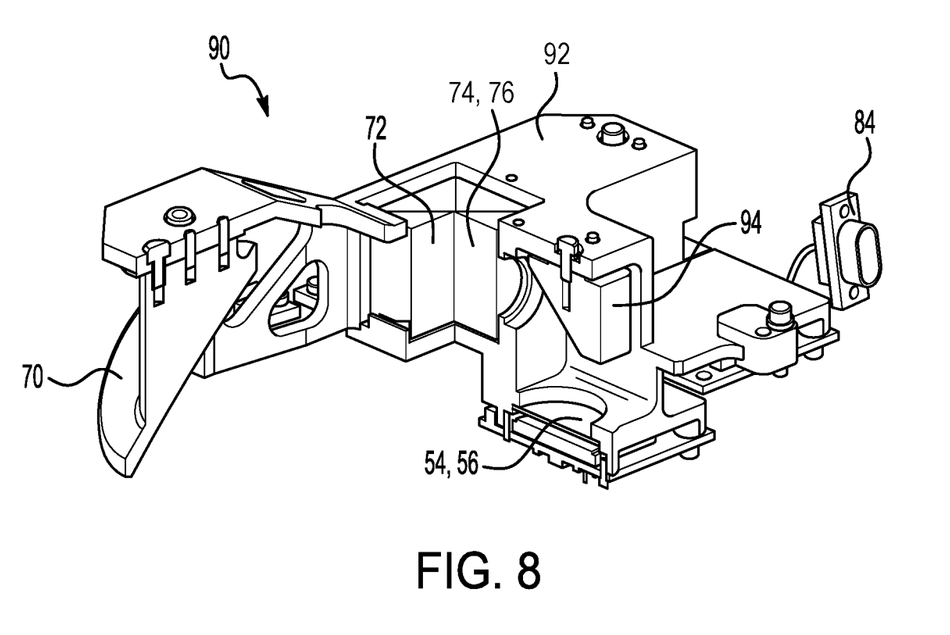
FIG. 8 shows an oblique sectional view of the sensor housing assembly of FIG. 7.
Figure 9:
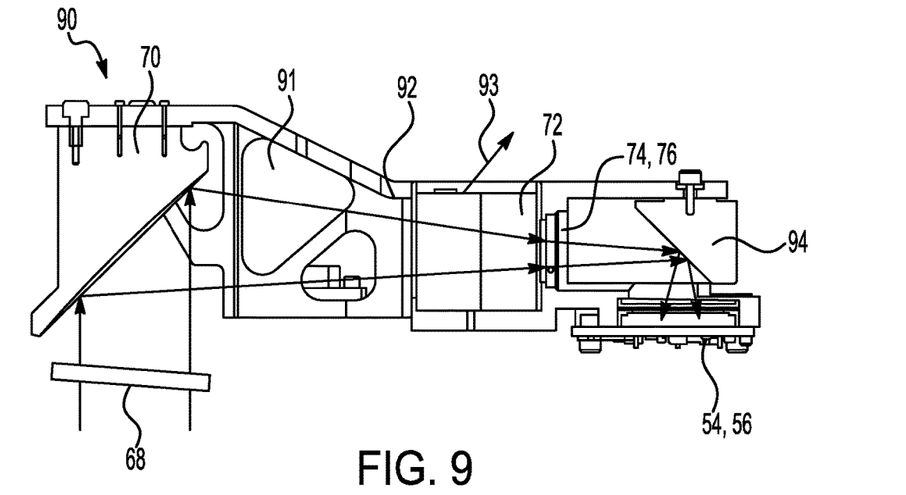
FIG. 9 shows a side sectional view of the sensor housing assembly of FIG. 7.

FIGS. 7-9 show an exemplary sensor housing assembly 90 for the common optical bench 26 according to any of the previously described embodiments. FIG. 7 shows a top oblique view of the sensor housing assembly 90, FIG. 8 shows a sectional oblique view of the sensor housing assembly 90, and FIG. 9 shows a side view of the sensor housing assembly 90 including the downstream path of travel 91. As shown in FIG. 9, the power filtering device 68 is positioned proximate the common collecting optical element 70 which is secured to a main body 92 of the sensor housing assembly 90 via any suitable fasteners. The common collecting optical element 70 is positioned proximate the beam splitter of the optical element 72 of the PSD arrangement for optical communication therewith. The optical element 72 is shown as a beam splitter that may be configured to split the beams along an additional optical path 93 to an additional sensor.

The beam splitter 72 and other optical elements of the PSD arrangement are supported in the main body 92 of the sensor housing assembly 90 adjacent a transform optical element 74, 76 that constitutes the compaction optical element. The transform optical element 74, 76 is also supported in the main body 92 of the sensor housing assembly 90 adjacent a fold mirror 94 that constitutes another compaction optical element. The PSDs 54, 56 and cameras 84 of the PSD arrangement are also supported by the main body 92. The sensor housing assembly 90 shown is merely exemplary and many other configurations of the sensor housing assembly 90 may be suitable to support the common optical bench described herein.

Figure 10:
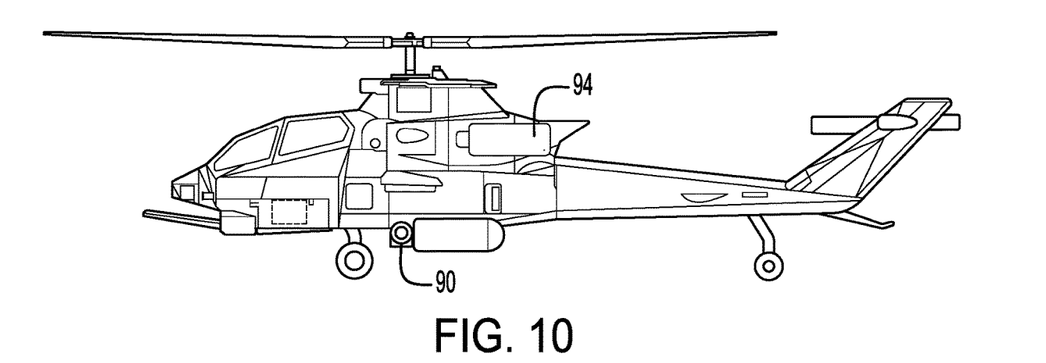
FIG. 10 shows an exemplary application in which the sensor housing assembly of FIG. 9 is implemented in a helicopter.
Figure 11:
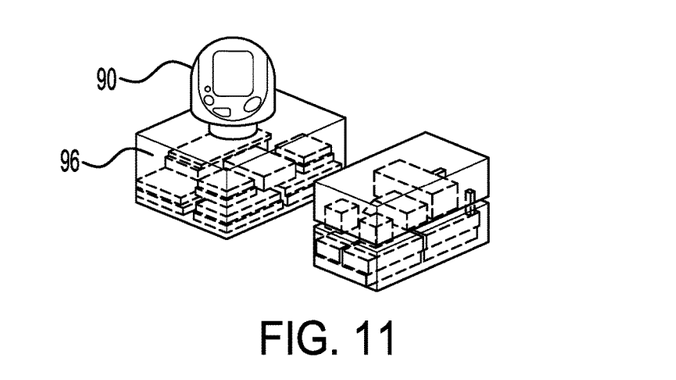
FIG. 11 shows an exemplary application in which the sensor housing assembly of FIG. 9 is implemented in a stationary load.
Figure 12:
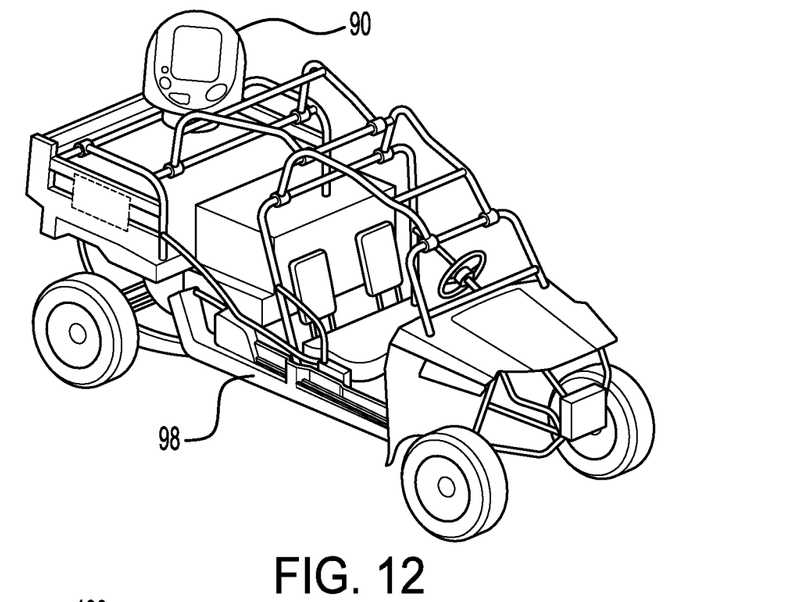
FIG. 12 shows an exemplary application in which the sensor housing assembly of FIG. 9 is implemented in a land vehicle.

FIGS. 10-12 show three possible installations of the sensor housing assembly 90 shown in FIGS. 7-9. FIG. 10 shows the sensor housing assembly 90 mounted on a helicopter 94. FIG. 11 shows the sensor housing assembly 90 mounted on a stationary installation 96. FIG. 12 shows the sensor housing assembly 90 mounted in a land vehicle 98. Many other installations/mountings are possible, for example on buildings or other stationary structures, on land vehicles of various types, on water vehicles of different types, and on aerospace vehicles (air or space) of many sorts.

Figure 13:
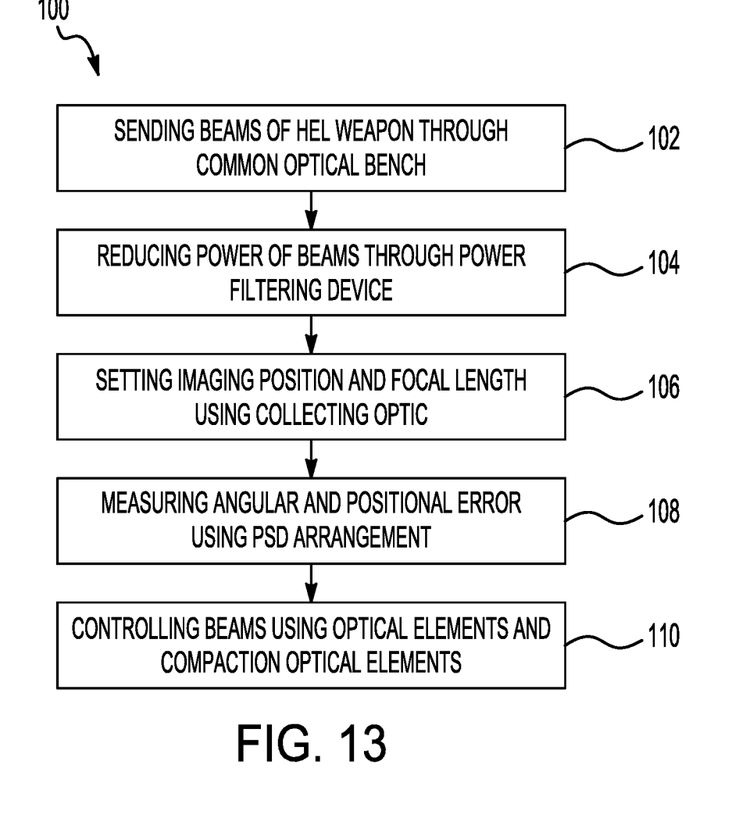
FIG. 13 shows a flowchart illustrating a method for operating the laser sensor system of FIG. 1.

FIG. 13 shows a flowchart illustrating a method 100 of operating an HEL weapon 12 (shown in FIG. 1). The method 100 may include using the laser sensor system 10 including any of the previously described components. Step 102 of the method 100 includes sending different beams 32, 66 (shown in FIGS. 1 and 2) of the HEL weapon 12 through a common optical bench 26, 26a, 26b, 26c, 26d of the HEL weapon (shown in FIGS. 1-9) arranged along a common optical path, with the beams 32, 66 including at least part of an HEL beam 32 and an auto-alignment beam 34. Step 104 of the method 100 includes reducing power of the beams through a power filtering device 68 (shown in FIGS. 2-6 and 9) of the common optical bench 26, 26a, 26b, 26c, 26d that is optically downstream of a beam source 42 (shown in FIG. 1) of the HEL weapon 12.

Step 106 of the method 100 includes setting an imaging position and a focal length of the beams 32, 66 using the collecting optical element 70 (shown in FIGS. 2-9) of the common optical bench 26, 26a, 26b, 26c, 26d, with the common collecting optical element 70 being downstream the power filtering device 68. Step 108 of the method 100 includes measuring angular errors and positional errors of the different beams 34, 66 using the PSD arrangement including the PSDs 54, 56 (shown in FIGS. 1-9). Step 108 may include independently measuring angular errors and positional errors of the different beams using the PSD arrangement of the common optical bench 26, 26a, 26b, 26c, 26 relative to beam correction sensors and/or tracking sensors arranged downstream the PSD arrangement.

Step 110 of the method 100 includes controlling the different beams 34, 36 using optical elements 72 of the PSD arrangement and further compaction optical elements 74, 76 (shown in FIGS. 2-9) of the common optical bench 26, 26a, 26b, 26c, 26d. The method 100 may further include at least one of increasing the focal length of at least one of the different beams 32, 66 using at least one of a mirror, a corner cube, a retroreflector, or a beam bender, or splitting the different beams 32, 66 off from the common optical path using a beam splitter of the common optical bench 26, 26a, 26b, 26c, 26d.

Although the disclosure has been shows and describes certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. A laser sensor system comprising:
   a high-energy laser (HEL) beam source configured to generate different beams that share a common optical path;
   output optics downstream of the HEL beam source along the common optical path; and
   a common optical bench arranged along the common optical path downstream of the HEL beam source and upstream of the output optics, the common optical bench configured to receive the different beams and including, in the common optical path downstream of the HEL beam source and upstream of the output optics:
      a power filtering device;
      at least one collecting optical element optically coupled to and downstream the power filtering device;
      a position sensitive detector (PSD) arrangement for measuring angular and positional errors in the different beams, the PSD arrangement being optically coupled to and downstream the at least one collecting optical element; and
      at least one compaction optical element optically coupled to the PSD arrangement.

2. The laser sensor system according to claim 1, wherein the at least one collecting optical element includes an achromatic refractive and/or reflective element.

3. The laser sensor system according to claim 1, wherein the PSD arrangement includes:
   at least one positional PSD;
   at least one angular PSD; and
   at least one of a mirror, a corner cube, a retroreflector, or a beam bender.

4. The laser sensor system according to claim 1, wherein the PSD arrangement includes a beam splitter optically coupled to the at least one collecting optical element.

5. The laser sensor system according to claim 1, wherein the at least one compaction optical element includes a mirror, a corner cube, a retroreflector, or a beam bender.

6. The laser sensor system according to claim 1, wherein the PSD arrangement includes a corner cube and the at least one compaction optical element includes a spherical mirror optically coupled to the corner cube.

7. The laser sensor system according to claim 1, wherein the at least one compaction optical element arrangement includes at least one fold mirror.

8. The laser sensor system according to claim 1, wherein the PSD arrangement includes at least one scraper mirror.

9. The laser sensor system according to claim 1, wherein the at least one compaction optical element includes a re-image transform optical element and/or a far field transform optical element.

10. The laser sensor system according to claim 9, wherein the at least one compaction optical element includes at least one fold mirror downstream the re-image transform optical element and/or the far field transform optical element, and upstream a PSD of the PSD arrangement.

11. The laser sensor system according to claim 1,
   wherein the PSD arrangement includes PSDs and at least one tracking sensor.

12. The laser sensor system according to claim 1, wherein the filtering device includes a filter wheel.

13. The laser sensor system according to claim 1, wherein the HEL beam source emits an HEL beam and an auto-alignment beam that is co-aligned with the HEL beam along the common optical path, the common optical bench being configured to receive the auto-alignment beam and a portion of the HEL beam.

14. The laser sensor system according to claim 1 further comprising a housing in which the at least one collecting optical element, the PSD arrangement, and the at least one compaction optical element are housed.

15. The laser sensor system according to claim 1, wherein the common optical bench is modular.

16. A method of operating a high-energy laser (HEL) weapon, the method comprising:
   sending different beams of the HEL weapon through a common optical bench arranged along a common optical path of the HEL weapon, the beams including an auto-alignment beam and at least part of an HEL beam;
   reducing power of the beams through a power filtering device of the common optical bench that is optically downstream of a beam source of the HEL weapon;
   setting an imaging position and a focal length using a collecting optic of the common optical bench, the collecting optic being downstream the filtering device;
   measuring angular errors and positional errors of the different beams using a position sensitive detector (PSD) arrangement of the common optical bench downstream the collecting optic; and
   controlling the different beams using optical elements of the PSD arrangement and further compaction optical elements of the common optical bench that are optically coupled to the PSD arrangement; and
   further comprising independently measuring angular errors and positional errors of the different beams using the PSD arrangement of the common optical bench relative to beam correction sensors and/or tracking sensors arranged downstream the PSD arrangement.

17. The method of claim 16 further comprising increasing the focal length of at least one of the different beams using at least one of a mirror, a corner cube, a retroreflector, or a beam bender.

18. The method of claim 16 further comprising splitting the different beams off from the common optical path using a beam splitter of the common optical bench.

* * * * *